May 31, 1932. H. G. LANCE 1,860,810
HAND TRUCK
Filed Sept. 27, 1929 3 Sheets-Sheet 1
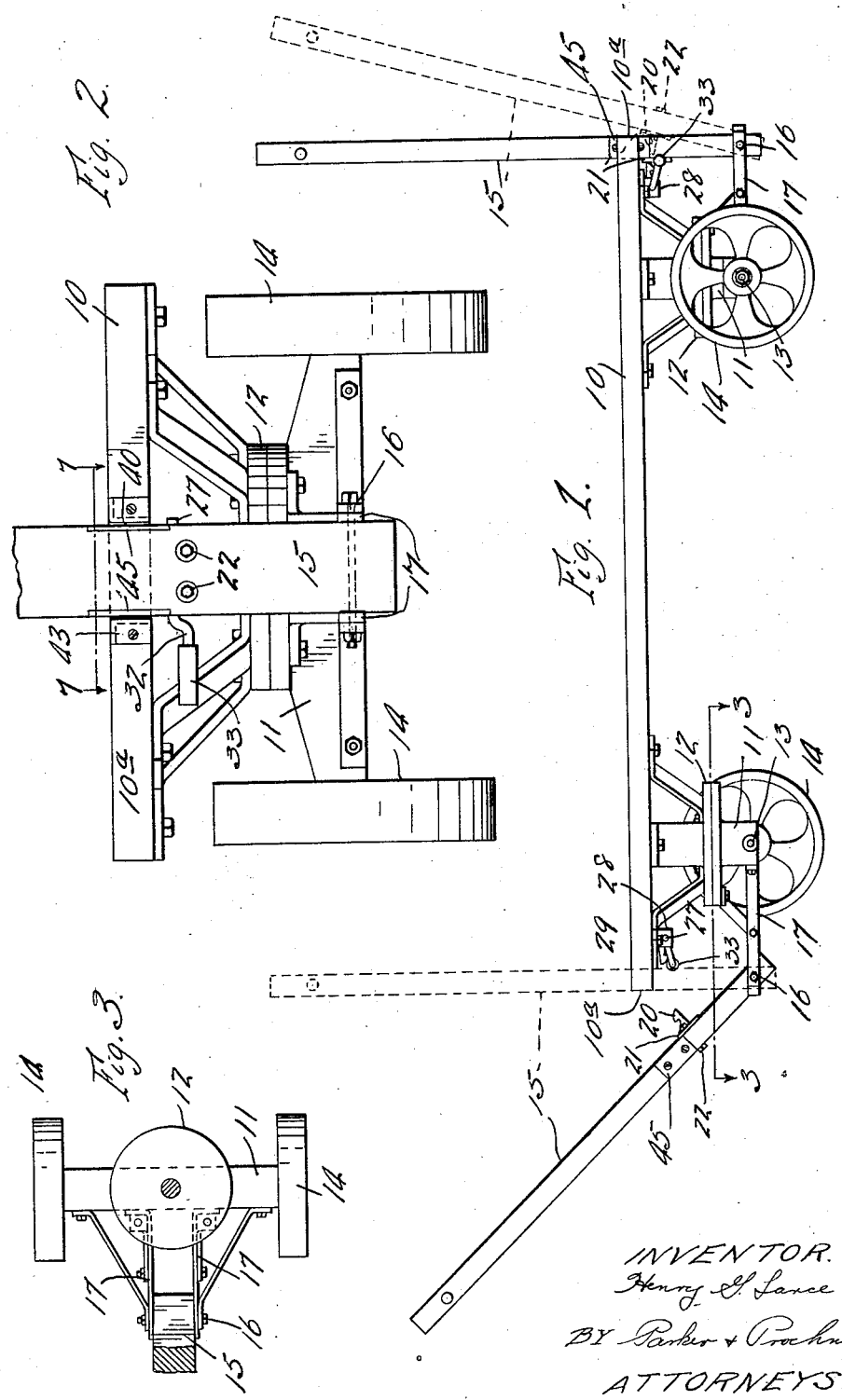

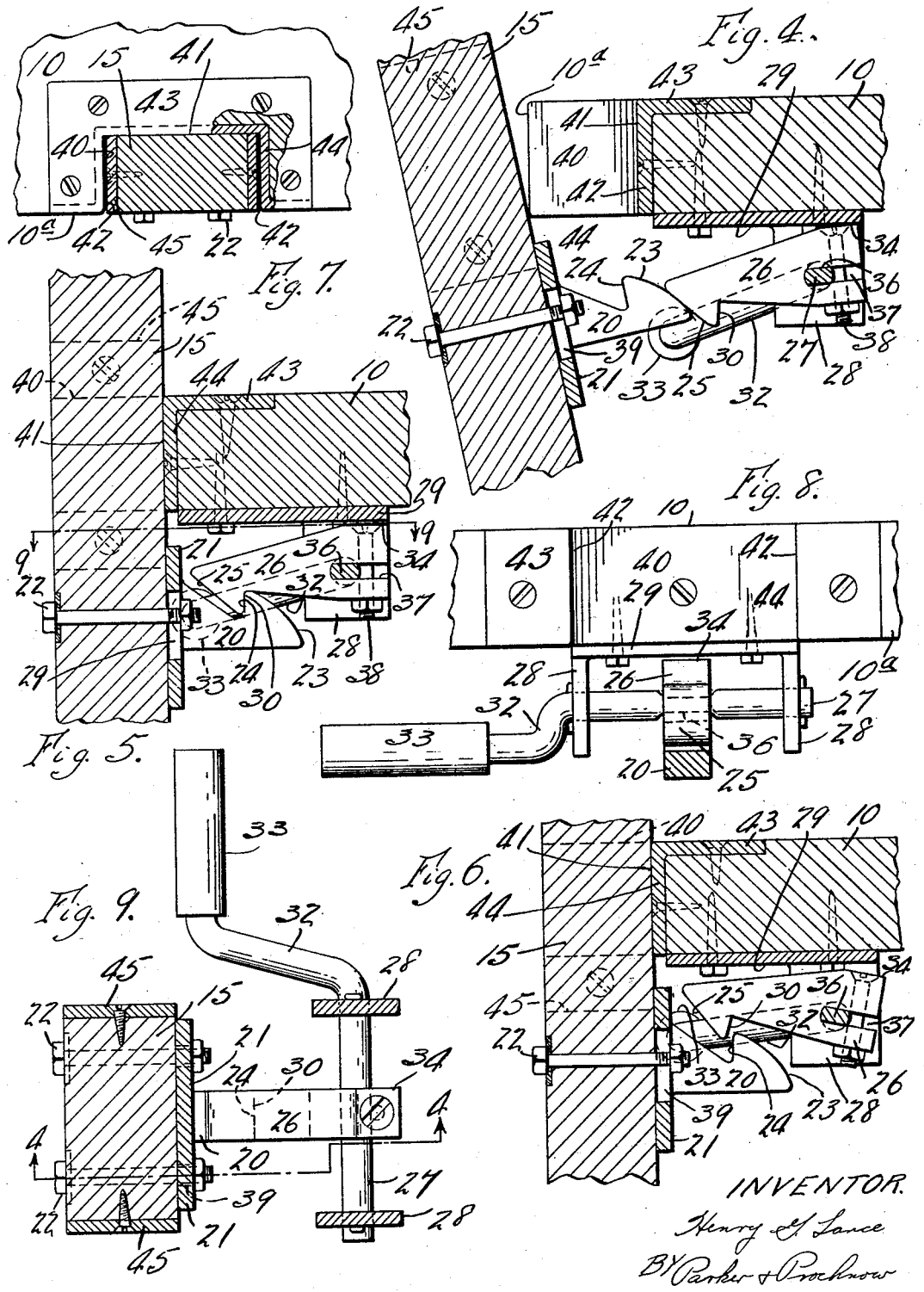

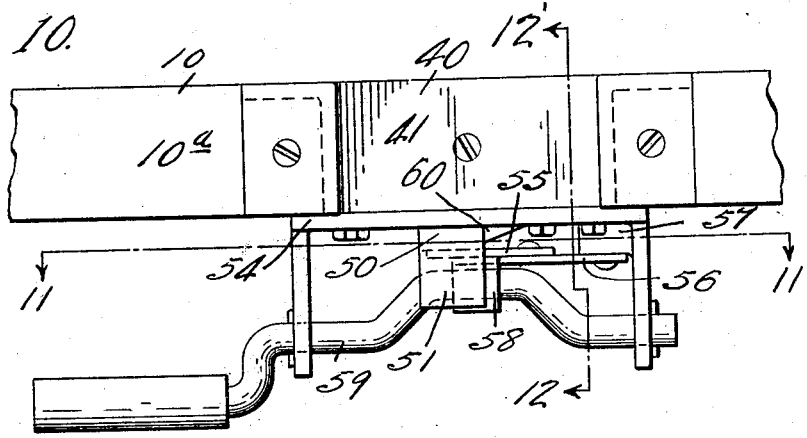
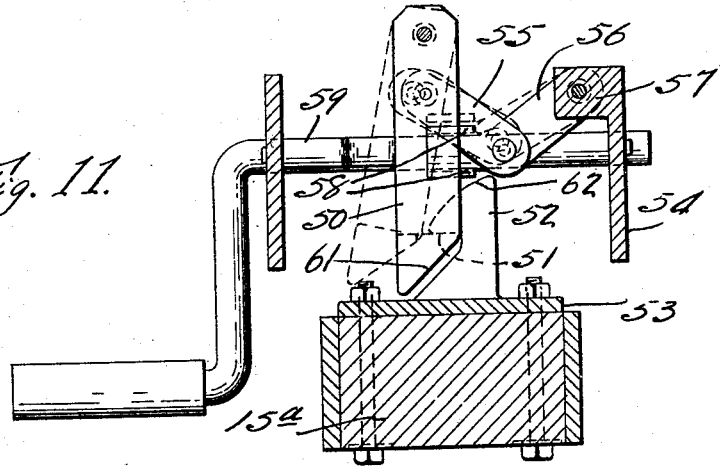
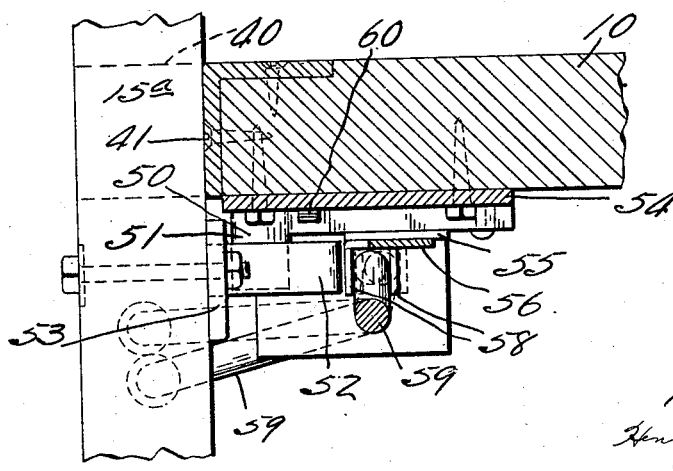

Patented May 31, 1932

1,860,810

UNITED STATES PATENT OFFICE

HENRY G. LANCE, OF BUFFALO, NEW YORK, ASSIGNOR TO DANIEL E. KNOWLTON, OF BUFFALO, NEW YORK

HAND TRUCK

Application filed September 27, 1929. Serial No. 395,604.

This invention relates to improvements in hand trucks or vehicles such as are used in warehouses and elsewhere for moving commodities from place to place, and which are provided at opposite ends with swivelled wheel-trucks each provided with a pivoted handle by either of which the vehicle can be moved and steered. When one handle is being used for manipulating the truck, the other is secured stationarily to the body or platform of the hand truck, so as to hold the wheel-truck to which this handle is pivoted from swinging about the axis of its fifth wheel.

This invention relates particularly to improved holding means and automatic latch or locking mechanism for the handles of such trucks or vehicles.

Trucks of this character are used, for example, in cold storage warehouses where they are subjected to great extremes of temperature, and atmospheric conditions as when moving goods during the summer into and out of the freezing rooms. Thus the handle holding and latch mechanisms with the other parts of the trucks are subjected to expansion and contraction and distortion, and consequent changes in the relation of the parts thereof, and unless provision is made for this, the handle locking mechanisms at times fail to function properly.

These trucks are frequently heavily loaded, and during their manipulation often come in contact with parts of a building, or collide one with another or with other objects, and it is therefore desirable that the holding or latch mechanism for the handles be of rugged construction, and be so designed and disposed as to be protected from damage from such collisions.

Some objects of the invention therefore are to provide an improved hand truck or vehicle having a novel handle holding and latch or locking mechanism of strong and rugged construction, which will operate easily and efficiently and which will not readily get out of order; also to provide a truck having mechanism of this sort so constructed and disposed that the same is protected from damage due to the rough usage to which the truck is subjected.

Further objects of the invention are to provide hand trucks having pivoted handles with mechanism for automatically locking said handles to the platform or body of the truck and holding the same securely from lateral movement or displacement when said handles are swung to an upright, inoperative position and which mechanism is constructed to readily permit said handles to be released; and also to provide such mechanism with a novel gravity latch which is so constructed and mounted as to compensate for wear in said mechanism and in the pivotal and other connections between the handles and the truck body or platform, and which also compensates for variations in the relation of the parts of the mechanism due to expansion and contraction, whereby the latch or locking mechanism will operate efficiently under such conditions.

Other objects are to improve the construction of hand trucks and the holding and latch or locking mechanisms for the handles thereof in the other respects hereinafter set forth and claimed.

In the drawings:—

Fig. 1 is a side elevation partly in section, of a hand truck or vehicle provided with one embodiment of handle holding and automatic latch or locking mechanism, constructed in accordance with the invention;

Fig. 2 is an end elevation thereof, on an enlarged scale.

Fig. 3 is a fragmentary, horizontal section thereof, approximately on line 3—3, Fig. 1.

Fig. 4 is a longitudinal vertical section, on an enlarged scale, of the handle holding and locking or latch mechanism therefor approximately on line 4—4, Fig. 9 with the parts about to assume their locking position.

Fig. 5 is a similar view with the mechanism in handle locking position.

Fig. 6 is a similar view with said parts in released position.

Fig. 7 is a fragmentary, horizontal section of the holding means for preventing lateral displacement of the handle when in locked position, taken on line 7—7, Fig. 2.

Fig. 8 is an end elevation of a part of the truck platform, and a portion of the handle locking mechanism, partly in section.

Fig. 9 is a horizontal section of the handle and the locking mechanism, in locked position, on line 9—9, Fig. 5.

Fig. 10 is an end view of a portion of a hand truck provided with automatic handle locking or latch mechanism of modified construction.

Fig. 11 is a horizontal section thereof, on line 11—11 Fig. 10, showing the parts in handle locking and releasing position in full and broken lines respectively.

Fig. 12 is a longitudinal vertical section thereof, on line 12—12, Fig. 10.

The hand truck or vehicle in general, see Figs. 1-3, is of well-known construction and comprises a horizontal platform or body 10 upon which the goods or commodities are loaded, and below each end of which is arranged a wheel-truck 11 pivoted or swivelled to the platform by means of a fifth-wheel structure 12. The axle 13 of each wheel truck supports a pair of wheels 14. A vertically swinging handle 15 for operating the truck is attached to each wheel-truck 11, as by being pivoted at 16 below the platform 10 to and between the spaced ends of forwardly extending rigid brackets or members 17 of suitable construction fixed to the wheel-truck.

When one handle 15 is to be used for manipulating and steering the hand truck, the other handle is swung to an upright position and stationarily secured to the truck platform 10 by the automatic holding or locking means, so as to hold the wheel-truck to which it is pivoted from turning relatively to said platform.

In accordance with the invention, each handle 15 is provided with a stationary hook or member, which, when the handle is swung to its upright inoperative position is engaged with and automatically actuates a cooperating dog or latch on the truck. This dog is retained in locking position, preferably by gravity until released by the person using the truck.

In the construction shown in Figs. 1-9 each handle 15 is provided with a rearwardly extending, upwardly facing hook 20 carried by a plate 21 secured to the rear face of the handle by suitable bolts or other fastenings 22. The hook 20 has a terminal latch-actuating curved face or cam 23 connecting with an intermediate flat upright face 24.

As the handle approaches the limit of its rearward movement to upright position, the cam face 23 of the hook 20, see Fig. 4, engages an inclined terminal face 25 of a forwardly extending hooked gravity-dog or latch 26. This dog is preferably secured on a transverse, horizontal rod or member 27, journaled to provide free pivotal movements of the dog in holes in a pair of spaced lugs 28. These lugs depend from a plate 29 secured to the underside of the platform 10 inwardly of the adjacent end wall 10a thereof. The engagement of the dog 26 by the hook 20 and the continued rearward movement of the handle 15 causes the dog 26 to be lifted as the hook 20 passes under the same, and when the limit of movement of the handle has been reached, said dog drops by gravity, an upright shoulder 30 thereon passing in front of and interlocking with the corresponding upright face 24 of the hook, see Fig. 5, thus locking the handle and preventing it from moving out of its upright position.

As shown in Figs. 8 and 9, the rod 27 is provided outwardly beyond one of the lugs 28 with a forwardly and laterally extending crank or handle 32, the end of which is preferably enlarged or weighted at 33. The influence of this weight 33 is to force the hooked forward end of the dog 26 downwardly, thus keeping it engaged with the hook 20 when the parts are locked, and permitting the latch to follow or shift with the hook should the relation of the parts of the latch or handle and their connections change due to variations in temperature or for other reasons.

In order to maintain the latch 26 in proper position for its engagement by the hook 20 and at the same time permit the necessary upward movement thereof when so engaged, a portion 34 of the upper face of the dog or latch is formed to act as a stop which is yieldingly held by the weight 33 in engagement with the plate 29 to limit the downward free movement of the dog to the position indicated in Fig. 4. In the swinging movement of the latch above its pivot 27 in the opposite direction, the stop 34 moves away from the plate 29, as shown in Fig. 6.

While either handle of the truck is positively and automatically locked in the manner described, the handle can be instantly released by grasping the weighted handle portion 33 connected with the appropriate locking dog 26 and lifting it upwardly to disconnect the dog from the hook 20. If both hands should be occupied, the user can trip the handle by means of his foot to release the truck handle.

It will be noted that the parts of the handle locking or latch mechanism are all located inwardly of and below the respective ends of the platform where they are out of the way, and are protected from damage when one truck collides with another or with parts of the building, or other objects, yet the parts 33 are easily accessible for actuating and releasing these mechanisms.

The dog 26 can be secured to the pivot rod or member 27 in any suitable way, but preferably as shown on Figs. 4-6, a portion of the rod intermediate the lugs 28 is flattened at 36 and is received and fits in the bottom of a rectangular open slot 37 formed in the dog. The flattened portion 36 of the rod is releasably but rigidly held in place in the slot 37 by means of a bolt or pin 38 passing vertically through the dog and slot and bearing against the rod. Thus a ready means of assembling these parts is provided, and relative displacement of the dog 26 and rod 27 is prevented.

Preferably also the hook plate 21 is made adjustable lengthwise of the handle 15 as by passing the fastening bolts 22 through vertical slots 39 in said plate. In this way the hook 20 can be initially adjusted and positioned on the handle 15 for proper operative engagement with the latch or dog 26, and the hook can be further adjusted from time to time to compensate for wear and looseness in the pivotal connections for the handle and in the fifth wheel or other parts of the truck, such as would cause relative change in position between the hook 20 and dog 26.

In order to prevent lateral play of either handle of the truck when in upright locked position, each handle is received in a recess or pocket 40 formed in the corresponding end 10a of the truck platform or body 10, see Figs. 6 and 7. These recesses correspond substantially to the cross sectional dimensions of the handles, so that the bottom wall 41 of each recess acts as a stop to arrest the handle when the same has been moved to locking position. Preferably, the bottom wall 41 is so disposed that when the handle is in engagement therewith the faces 24 and 30 of the hook 20 and dog 26 respectively are in contact, thus preventing longitudinal play and rattling of the handle and locking means in the movements of the truck, see Fig. 5. The side walls 42 of the recess likewise prevent lateral movements of the handle when locked, and as the handle is disposed entirely within the recess with its outer face either substantially flush with or below the end wall 10a, any blows or shocks received by the handles will be taken up by the walls of the recess 40, and will not be transmitted through the hook 20 to the locking mechanism.

Preferably the recess 40 is metal bound for protection against wear, as by the use of a plate 43 secured to the top face of the platform and having a depending U-shaped flange 44 fitting the recess and preferably extending laterally beyond the front corners thereof, see Fig. 7.

If desired, the sides of those portions of the handles which extend into the recesses 40 can be provided with wear plates 45 to protect the handles against wear.

A modified form of handle locking mechanism is shown in Figs. 10-12, wherein a gravity actuated locking dog 50 movable in a horizontal plane instead of a vertical plane is employed. This dog 50 has at one end a depending locking finger 51, engageable with a laterally engaging hook 52 projecting rearwardly from a plate 53 adjustably secured to the handle 15a as in the first construction. The other end of the dog 50 is pivoted to the underside of a fixed plate 54 on the platform, and intermediate of its ends, the dog is also pivotally connected to one end of a horizontal toggle link 55. The other end of said link is in turn pivoted intermediate the ends of a second toggle link 56 which has one end pivoted to a lug 57 on the aforementioned plate 54. The other end of the link 56 is formed with a pair of depending spaced projections 58 which straddle a transverse horizontal crank rod 59. The crank rod extends forwardly and thence laterally and is weighted as in the first construction. The weight reacts on the links 55 and 56 through the projections 58 to hold these links in the angular relation shown in Fig. 11, thereby releasably holding the finger 51 of the locking dog in locking relation to the hook 52 of the truck handle. By swinging the weighted end of the crank 59 upwardly, the dog 50 is moved laterally on its pivot as shown in broken lines Fig. 11, to release the handle, after which the weight returns the locking dog and links to locking position.

The parts are maintained in this position by the engagement of the dog 50 against a fixed stop 60 on the underside of said plate 54. The dog 50 and hook 52 are formed with cooperating cam faces 61 and 62 respectively to permit the hook to deflect the dog laterally as the handle 15a approaches its upright locking position.

The handle 15a is received in a metal bound recess 40 in the end wall 10a of the platform, as before.

The automatic handle locking mechanisms described are comparatively simple and inexpensive, and are efficient in operation. The parts cannot readily get out of order, and the latch dogs by reason of their gravity actuation, follow and adjust themselves to changes due to wear and variations in temperature. The handle holding recess, being metal bound, prevents oscillation of the handle and protects the same and the mechanism from injury. By arranging the locking mechanisms rearwardly beneath the ends of the truck, the parts thereof are also protected from injury in the use of the truck.

Claims:

1. In a hand truck having a platform, a handle pivoted below said platform to swing towards and from an upright position, a fixed hook on said handle, and locking mechanism for said handle disposed beneath said platform inwardly of an end wall thereof and in rear of said handle when the same occupies said upright position, whereby said mechanism is protected against blows received against said end of said truck, said mechanism comprising a locking dog, a pivoted weight-actuated part on which said dog is fixed and which permits said dog to move by gravity into locking relation with said hook when said handle is raised to its upright position, interfitting faces on said hook and on said dog, and said platform having a stop face against which said locked handle engages when moved to locking position so as to prevent relative movements between said hook face and said dog face in the movement of the truck from place to place.

2. In a hand truck having a platform, a wheel-truck swivelled thereon to turn horizontally, a handle connected to said wheel-truck to swing towards and from an upright position, locking mechanism for said handle including a hook on said handle, a gravity actuated locking dog on said platform with which said handle engages when moved to said upright position to hold said handle from lateral movement and said wheel truck from turning, said locking dog being pivoted upon and disposed beneath said platform inwardly beyond an end thereof and said handle hook being disposed so as to extend rearwardly therefrom when said handle is in upright position and project inwardly underneath said platform to engage said dog, whereby said locking mechanism is protected from damage in the use of the truck.

3. In a hand truck having a platform, a wheel-truck swivelled thereon to turn horizontally, a handle connected to said wheel-truck to swing towards and from an upright position, and said platform having a recess in an end thereof into which said handle enters and fits when moved to said upright position whereby said handle is held from lateral movement and said wheel truck is prevented from turning, locking mechanism for said handle which automatically engages and positively holds said handle in said recess by the movement of sand handle to said upright position, said locking mechanism being disposed beneath and inwardly beyond said end of said platform and in rear of said handle so as to be protected from damage in the use of the truck, and a face in said recess which acts as a stop to arrest said handle to position the same in operative relation to said locking mechanism.

HENRY G. LANCE.